United States Patent
Mu et al.

(10) Patent No.: US 9,384,765 B1
(45) Date of Patent: Jul. 5, 2016

(54) METHOD AND SYSTEM FOR PROVIDING A HAMR WRITER HAVING IMPROVED OPTICAL EFFICIENCY

(71) Applicant: Western Digital (Fremont), LLC, Fremont, CA (US)

(72) Inventors: Jianwei Mu, Pleasanton, CA (US); Hongxing Yuan, San Ramon, CA (US); Michael V. Morelli, San Jose, CA (US); Sergei Sochava, Sunnyvale, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/864,665

(22) Filed: Sep. 24, 2015

(51) Int. Cl.
*G11B 5/02* (2006.01)
*G11B 5/33* (2006.01)
*G11B 5/48* (2006.01)
*G11B 5/60* (2006.01)
*G11B 11/00* (2006.01)
*G11B 5/00* (2006.01)

(52) U.S. Cl.
CPC ............ *G11B 5/4866* (2013.01); *G11B 5/6082* (2013.01); *G11B 2005/0021* (2013.01)

(58) Field of Classification Search
CPC ............... G11B 2005/0021; G11B 2005/0005; G11B 5/0314; G11B 5/3903; G11B 5/5967
USPC .................. 360/59, 313, 318, 328; 369/13.33, 369/13.13, 112.27
See application file for complete search history.

(56) References Cited

U.S. PATENT DOCUMENTS

| | | | |
|---|---|---|---|
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |

(Continued)

OTHER PUBLICATIONS

Zhong Shi, et al., U.S. Appl. No. 13/797,268, filed Mar. 12, 2013, 21 pages.
A.R. Nelson, Coupling optical waveguides by tapers. Applied Optics, vol. 14, No. 12, pp. 3012-3015 (1975).
A. F. Milton and W. K. Burns, Mode coupling in optical waveguide horns, IEEE J. Quantum Electron. QE-13, No. 10, pp. 828-835 (1977).

(Continued)

*Primary Examiner* — Nabil Hindi

(57) ABSTRACT

A heat-assisted magnetic recording (HAMR) write apparatus includes a laser and has an air-bearing surface (ABS) that resides in proximity to a media during use. The HAMR write apparatus includes a write pole that writes to the media, coil(s) for energizing the write pole and a waveguide optically coupled with the laser. The waveguide includes an entrance distal from the ABS and a bottom proximate to the ABS. The waveguide also includes a mode converter, a mode stripper optically coupled with the mode converter and an inverse tapered section optically coupled with the mode stripper. The mode converter has sides converging from a first width proximate to the entrance to a second width distal from the entrance and less than the first width. The mode stripper is between the inverse tapered section and the mode converter. The inverse tapered section has an entrance and an exit wider than the entrance.

17 Claims, 4 Drawing Sheets

(56) References Cited

U.S. PATENT DOCUMENTS

| | | |
|---|---|---|
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |

(56) References Cited

U.S. PATENT DOCUMENTS

| | | |
|---|---|---|
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,428,358 B2 | 9/2008 | Lu et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |

(56) References Cited

U.S. PATENT DOCUMENTS

| | | |
|---|---|---|
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,944,782 B2 | 5/2011 | Cho et al. |
| 7,968,219 B1 | 6/2011 | Jiang et al. |
| 7,982,989 B1 | 7/2011 | Shi et al. |
| 8,000,178 B2 | 8/2011 | Shimazawa et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,098,547 B2 | 1/2012 | Komura et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,149,654 B2 | 4/2012 | Komura et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,228,779 B2 | 7/2012 | Peng et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,264,919 B2 | 9/2012 | Komura et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,284,637 B2 | 10/2012 | Jin et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |

(56) References Cited

U.S. PATENT DOCUMENTS

| | | | |
|---|---|---|---|
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,477,571 B1 * | 7/2013 | Zhou | G11B 5/3133 369/112.27 |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,605,556 B1 | 12/2013 | Peng et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,619,514 B1 | 12/2013 | Matsumoto |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,787,128 B2 | 7/2014 | Kato et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,813,324 B2 | 8/2014 | Emley et al. |
| 8,923,102 B1 | 12/2014 | Shi et al. |
| 9,001,628 B1 | 4/2015 | Shi et al. |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0108212 A1 | 5/2013 | Peng et al. |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0154529 A1 | 6/2014 | Yang et al. |
| 2014/0175050 A1 | 6/2014 | Zhang et al. |
| 2015/0016234 A1 | 1/2015 | Itagi et al. |

OTHER PUBLICATIONS

K. Kasaya, O. Mitomi, M. Naganuma, Y. Kondo, Y. Noguchi, A simple laterally tapered waveguide for low-loss coupling to single-mode fibers. IEEE Photon. Technol. Lett. 5, No. 3, pp. 345-347 (1993).

Vilson R. Almeida, Roberto R. Panepucci, and Michal Lipson, Nanotaper for compact mode conversion. Optics Letters, vol. 28, No. 15, pp. 1302-1304 (2003).

* cited by examiner

METHOD AND SYSTEM FOR PROVIDING A HAMR WRITER HAVING IMPROVED OPTICAL EFFICIENCY

BACKGROUND

Conventional heat assisted magnetic recording (HAMR) utilizes a laser in a conjunction with magnetic recording technology to write to magnetic media in a disk drive. Light is provided from a laser to a waveguide in a HAMR transducer fabricated on a slider. The light travels through the waveguide toward the ABS and is coupled into a near-field transducer (NFT). The NFT couples light into the media at a spot size smaller than the optical diffraction limit, heating a region of the media. Coils in the transducer energize the main pole to magnetically write to a portion of the media heated by the spot size at a relatively modest field. Thus, data may be written to the media.

In order for HAMR transducers to function as desired, sufficient energy is delivered to heat the media. Various issues may affect the ability of the HAMR transducer to deliver the desired optical power to the NFT and, therefore, to the media. For example, in some cases, misalignments between the laser and the entrance of the waveguide, deformations in the waveguide, nonuniformities in the core material and/or waveguide imperfections may adversely affect the power delivered to the media. Such issues may be exacerbated in the case of a HAMR transducer using an interferometric tapered waveguide (ITWG). An ITWG splits the power provided to the waveguide into multiple arms of the waveguide. Each arm carries a portion of the laser power, or channel. The channels are recombined near the NFT where the arms come together. Changes in the phase and/or power of each channel may adversely affect the manner in which the channels recombine. Power provided to the NFT may be reduced. Accordingly, a mechanism for improving the efficiency of power delivery for a HAMR transducer is desired.

DETAILED DESCRIPTION OF THE PREFERRED EMBODIMENTS

Figure 1:
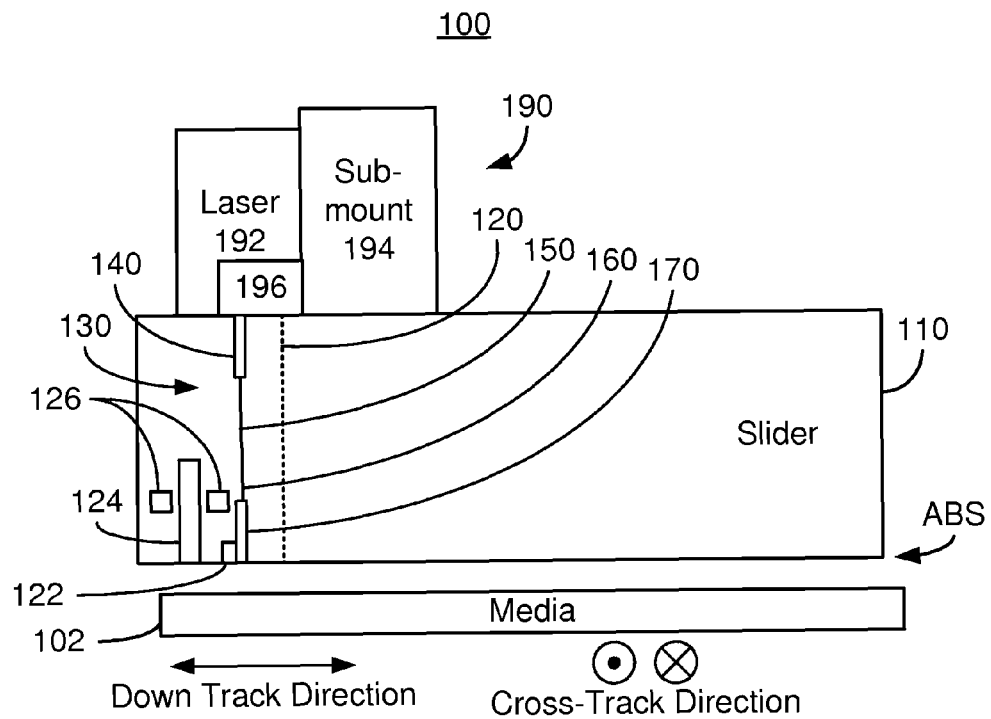
FIG. 1 is a side view of an exemplary embodiment of a HAMR disk drive.
Figure 2:
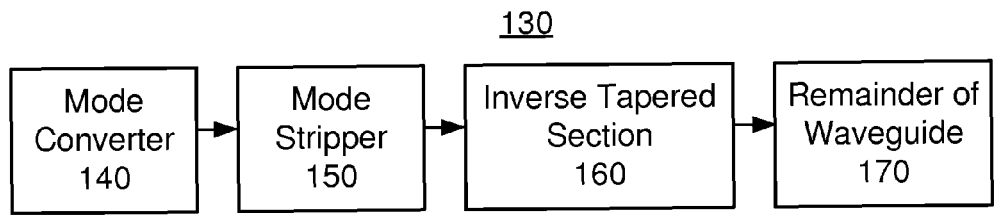
FIG. 2 is a block diagram of a waveguide for an exemplary embodiment of a HAMR disk drive.

FIG. 1 depicts an exemplary embodiment of a heat assisted magnetic recording (HAMR) disk drive.100. FIG. 1 is a side view of the HAMR disk drive 100. FIG. 2 is a block diagram depicting an exemplary embodiment of a waveguide 130 used in the HAMR disk drive 100. For clarity, FIGS. 1 and 2 are not to scale. For simplicity not all portions of the HAMR disk drive 100 are shown. In addition, although the HAMR disk drive 100 is depicted in the context of particular components other and/or different components may be used. For simplicity, only single components are shown. However, multiples of the component(s) and/or their sub-component(s) might be used.

The HAMR disk drive 100 includes media 102, a slider 110, a HAMR transducer 120 and a laser subassembly 190. Additional and/or different components may be included in the HAMR disk drive 100. The slider 110, the laser subassembly 190 and HAMR transducer 120 are generally attached to a suspension (not shown). The HAMR transducer 120 is fabricated on the slider 110 and includes an air-bearing surface (ABS) proximate to the media 102 during use.

In general, the HAMR disk drive 100 includes a write transducer and a read transducer. However, for clarity, only the write portion (HAMR transducer 120) of the head is shown. The HAMR transducer 120 includes optional near-field transducer (NFT) 122, a write pole 124, coil(s) 126, waveguide 130. In other embodiments, different and/or additional components may be used in the HAMR transducer 120. The laser subassembly 190 includes a laser 192, a submount 194 and an optional photodetector 196. The laser 192 may be an edge emitting laser diode. The laser subassembly 190 is generally affixed to the back side (the side opposite the ABS) of the slider 110. However, other locations are possible. The submount 194 is a substrate to which the laser 192 may be affixed for mechanical stability and ease of integration with the slider 110. The photodetector may be used to sample the light provided from the laser 192 to the HAMR transducer 120. Thus, the laser 192 may be controlled via feedback obtained from the photodetector 196. However, other configurations are possible.

The waveguide 130 is optically coupled with the laser 192 and NFT 122, which resides near the ABS. The waveguide 130 shown may be an interferometric waveguide (IWG). However, other configurations are possible. The waveguide 130 includes a mode converter 140, a mode stripper 150, an inverse tapered section 160, and an additional portion 170. The mode converter 140 is in proximity to the waveguide entrance and receives optical energy from the laser 192. The mode converter 140 has sides which taper such that the exit of the mode converter is narrower than its entrance. The mode converter aids in removing laser modes other than those which are desired to be coupled into the waveguide 130. However, some additional modes are generally present at the exit of the mode converter 140. For example, higher order modes may be present even after light has traversed the mode converter 140. Consequently, the mode converter 149 is coupled with the mode stripper 150.

The mode stripper 150 is used to suppress, or strip, some or all of the undesirable modes remaining in the laser energy after passing through the mode converter 140. In some embodiments, the fundamental mode is the desired mode for coupling into the NFT 122. Other modes extend over a larger region of the waveguide 140 in directions perpendicular to the direction of transmission. Thus, despite the use of the mode converter 140, other modes may remain. The mode stripper 150 removes some or, more preferably, all of the undesirable modes remaining. To do so, the mode stripper 150 is narrower than a remaining portion of the waveguide 130. For example, the mode stripper 170 may have a width (or area for a constant thickness) in a direction perpendicular to the transmission direction of not more than eighty percent of a remaining portion of the waveguide 130. In some embodiments, the width of the mode stripper 170 is at least sixty percent of the width of the remaining portion of the waveguide. The mode stripper also has length such that modes other than those of interest undergo at least a ninety percent loss in intensity. For example, if the fundamental mode is of interest, then the mode stripper 150 is sufficiently long that higher order modes undergo at least a ninety percent loss in power. However, the fundamental mode would undergo a loss of not more than ten percent power over the same length. In some embodiments, the length of the mode stripper is at least ten micrometers and not more than forty micrometers. Thus, the fundamental mode may be efficiently isolated and higher order modes suppressed using the mode stripper 150.

Optically coupled with the mode stripper 150 is an inverse tapered section 160. The inverse tapered section 160 increases the width (or area) of the waveguide 130 over that of the mode stripper 150. Thus, once the undesired modes have been removed, the waveguide 130 may be widened for subsequent transmission of the desired mode(s). The light is then transmitted to the remainder of the waveguide 170.

In operation, the light from the laser 192 is transmitted to the waveguide 130. The light is concentrated by the mode converter 140. As discussed above, the mode converter 140 may also remove some portion the additional modes carried by the waveguide 130. The remaining modes in the light from the laser 192 are transmitted to the mode stripper 150. As discussed above, the mode stripper 150 may rapidly and efficiently remove undesired modes from the waveguide 130. For example, the fundamental mode of the laser 192 may remain. Light is then transmitted to the remainder 170 of the waveguide 130. Light is then coupled from the waveguide 130 into the NFT 122. The NFT transfers energy to the media 102 in a desired region. The desired portion of the media 102 may be heated. Coil(s) 126 energize the pole 124, which writes to the desired portion of the media.

The HAMR disk drive 100 may have improved performance. Misalignments between the laser 192 and the waveguide 130 may result in undesired modes of laser light being coupled into the waveguide 130. The mode converter 140 may not remove all of these modes. However, these undesired modes may be more efficiently removed using the mode stripper 150. For example, the higher order modes of light from the laser 192 may be more efficiently suppressed using the mode striper 150. As a result, misalignments of the laser 192 may be accounted for. Optical efficiency of delivering light from the laser 192 to the media 102 may be enhanced. Consequently, performance of the HAMR disk drive 100 may be improved.

Figure 3:
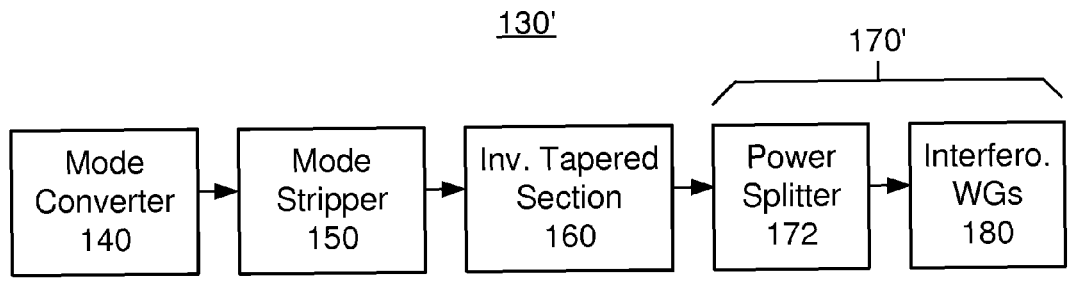
FIG. 3 depicts a block diagram of another exemplary embodiment of a waveguide for a HAMR disk drive.

FIG. 3 is a block diagram depicting another embodiment of a waveguide 130' usable in the HAMR disk drive 100. Thus, the waveguide 130' is described in the context of the HAMR disk drive 100. For clarity, FIG. 3 is not to scale. The waveguide 130' is analogous to the waveguide 130 and may be used in the HAMR disk drive 100. Referring to FIGS. 1 and 3, analogous portions of the waveguide 130' are labeled similarly to the waveguide 130. The waveguide 130' includes a mode converter 140, mode stripper 150, inverse tapered section 160 and a remaining portion 170' that are analogous to the mode converter 140, mode stripper 150, inverse tapered section 160 and remaining portion 170 depicted in FIG. 2. Thus, the structure and function of the mode converter 140, mode stripper 150 and inverse tapered section are analogous to that described above.

The remainder 170' of the waveguide 130' includes a power splitter 172 and at least one interferometric waveguide (IWG) 180. The IWG may be tapered or untapered. Thus, the waveguide 130' includes multiple arms in the IWG 180. Light from the inverse tapered section 160 is split into multiple channels using the power splitter 172. Thus, the IWG 180 includes multiple arms, each of which carries a channel. The arms of the IWG 180 may have different optical path lengths and recombine near the NFT 122. The path difference may be due to a physical path difference, a difference in optical properties of the material(s) used, some combination thereof and/or another mechanism for providing a path difference between channels. Consequently, the IWG 180 introduces a phase difference into the channels, then recombine the channels near the NFT 122. An interference pattern is thus established at or near the NFT 122. The maxima and minima of the interference pattern are provided at desired locations. Thus, energy may be coupled into the NFT 122.

The HAMR disk drive 100 using the waveguide 130' may have improved performance. As discussed above, misalignments between the laser 192 and the waveguide 130' may result in undesired modes being coupled into the waveguide 130'. At least some of these modes may be supported by the mode converter 140. If allowed to propagate through the waveguide 130', these additional modes might result in additional phase and/or power differences in the arms of the IWG 180. Thus, performance of the IWG would be adversely affected. However, the mode stripper 150 may more efficiently suppress higher order modes in the waveguide 130'. The fundamental mode may thus be coupled into the power splitter 172 and IWG 180. Higher order modes that may otherwise introduce additional phase difference(s) may no longer be present and thus may not be coupled into the IWG 180. Consequently, the channels carried by the arms of the IWG 180 may have the desired phase differences and powers. Thus, the IWG 180 may function as desired. The desired power may be delivered to the NFT 122 and media 102. Thus, writing is facilitated in the HAMR disk drive 100.

Figure 4:
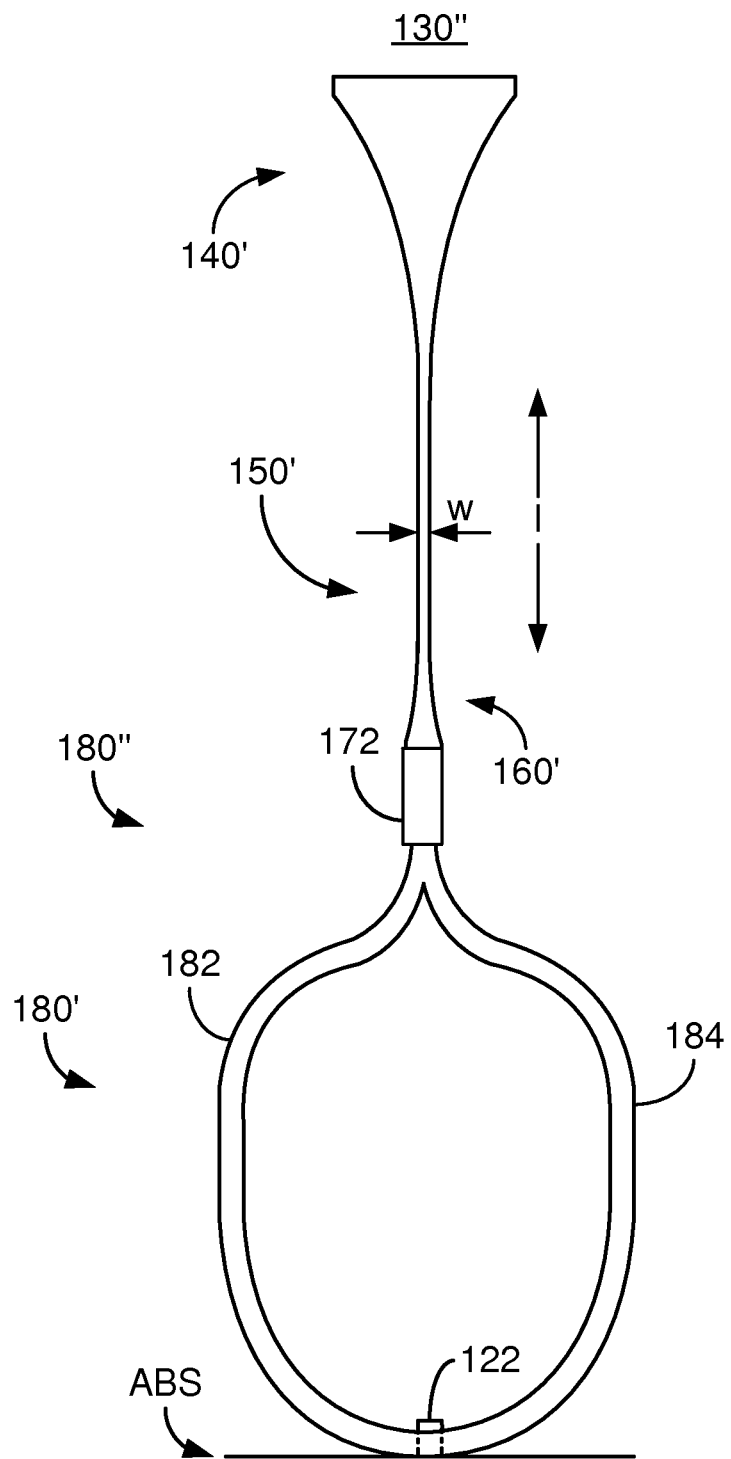
FIG. 4 depicts an exemplary embodiment of a waveguide for a HAMR write apparatus.

FIG. 4 depicts another embodiment of a waveguide 130" usable in the HAMR disk drive 100. Thus, the waveguide 130" is described in the context of the HAMR disk drive 100. For clarity, FIG. 4 is not to scale. The waveguide 130" is analogous to the waveguides 130/130' and may be used in the HAMR disk drive 100. Referring to FIGS. 1 and 4, an NFT 122 is also shown. Analogous portions of the waveguide 130" are labeled similarly to the waveguides 130/130'. The waveguide 130" includes a mode converter 140', mode stripper 150', inverse tapered section 160' and a remaining portion 170" that are analogous to the mode converter 140, mode stripper 150, inverse tapered section 160 and remaining portion 170/170' depicted in FIGS. 2-3. FIG. 4 depicts an exemplary embodiment of the geometry of the core of the waveguide 130". Although the waveguide 130" includes a core and cladding, for clarity, only the core is shown in FIG. 4. In the embodiment shown, the IWG 180' specifically includes two arms 182 and 184. In some embodiments, the arms 182 and 184 are desired to introduce a particular phase difference and carry channels of equal power.

The mode converter 140' has a curved taper. In other embodiments, the sides of the mode converter 140' may taper in accordance with a different function. For example, the sides of the mode converter 140' may linearly taper. The mode stripper 150' has a width, w, and a length, l. The area of the mode stripper 150' may be desired to be not more than eighty percent of the area of each of the arms 182 and 184. In some embodiments, the area of the mode stripper 150' is at least sixty percent of the area of each of the arm 182 and 184. In some embodiments, the width, w, of the mode stripper 150' is not more than eighty percent of the width of each of the arm 182 and 184. This may occur, for example, where the thickness of the waveguide (perpendicular to the plane of the page in FIG. 4) is substantially constant. In some such embodiments, the width of the mode stripper 150' is at least sixty percent of the width of each of the arms 182 and 184. The geometry of the mode stripper 150' is also configured such that the undesirable modes are effectively suppressed. For example, length l, of the mode stripper 150' may also be set such that at least ninety percent of the energy of the undesirable (higher order) modes is lost as the light traverses the mode stripper 150". In addition, not more than ten percent of the power of the desired (fundamental) mode is lost over the length l. The arms 182 and 184 of the waveguide 130" may have optical paths of different length. Where the arms 182 and 184 recombine, near the NFT 122, the optical path difference may result in an interference pattern.

Light energy from the laser 192 is coupled into the waveguide 130". The mode converter 140' removes some of the additional modes present in the light entering the waveguide 130". The mode stripper 150" efficiently continues this process. Energy from the mode stripper 150" is provided to the inverse tapered section 160', which is optically coupled to the power splitter 172. Using the power splitter 172, the energy is split between the arms 182 and 184. The light travels through arms 182 and 184 and recombines near the waveguide bottom/NFT 122. As such a standing wave interference pattern may be formed. The NFT 122 couples in light from this standing wave pattern. The NFT 122 focuses the light to a region of magnetic recording media 102, which is heated. High density bits can be written on a high coercivity medium with the pole 124 energized by the coils 126 to a modest magnetic field.

The HAMR disk drive 100 using the waveguide 130" may have improved performance. As discussed above, the mode stripper 150' may efficiently suppress the higher order/undesirable modes of light coupled into the waveguide 130". Thus, light having the desired phase and power may be provided to the arms 182 and 184 of the IWG 180'. Consequently, the channels carried by the arms 182 and 184 of the IWG 180' may have the desired phase differences and powers. For example, in some embodiments, the error in the phase between the arms 182 and 184 may not exceed ten degrees. Thus, the IWG 180' may function as desired. The desired power may be delivered to the NFT 122 and media 102. Thus, writing is facilitated in the HAMR disk drive 100.

FIGS. 5, 6, 7 and 8 depict portions of waveguides 200, 200', 200" and 200''', respectively. The waveguides 200, 200', 200" and 200''' correspond to the waveguides 130, 130' and/or 130". Thus, the waveguides 200, 200', 200" and 200''' may each include a mode converter (not shown), power splitter (not shown) and IWG (not shown) corresponding to mode converter 140/140', mode converter 170/70', the remaining portion 170/170'/170", including power splitter 162/162' and IWG 180/180'. However, for clarity, only the mode stripper and inverse tapered section are shown. In particular, FIGS. 5-8 depict examples of various geometries that might be used for the mode stripper and inverse tapered section.

Figure 5:
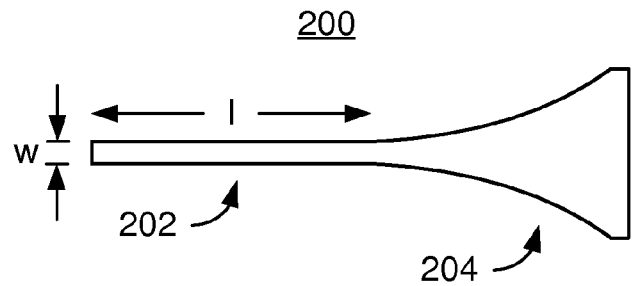
FIGS. 5-8 depicts exemplary embodiments of a portion of the waveguide in a HAMR write apparatus.

FIG. 5 depicts an embodiment of a portion of the waveguide 200 including the mode stripper 202 and the inverse tapered section 204. The mode stripper 202 is analogous to the mode stripper 140/140'. Thus, the length, l, width and thickness may be as described previously. The inverse tapered section 204 increases in width in accordance with a curve. The sides of the inverse tapered section 204 taper out with a function having an order greater than one. In some embodiments, the order may be two (quadratic), there (cubic) or another function.

Figure 6:
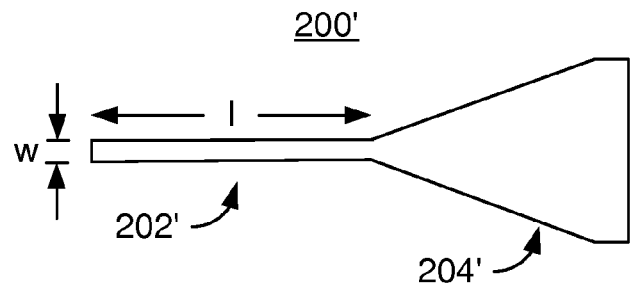

FIG. 6 depicts an embodiment of a portion of the waveguide 200' including the mode stripper 202' and the inverse tapered section 204'. The mode stripper 202' is analogous to the mode stripper 140/140'. Thus, the length, l, width and thickness may be as described previously. The sides of the inverse tapered section 204' taper out linearly.

Figure 7:
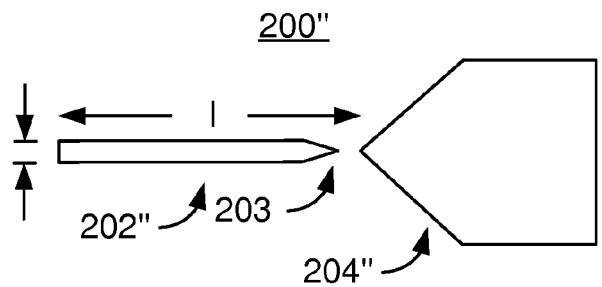

FIG. 7 depicts an embodiment of a portion of the waveguide 200" including the mode stripper 202" and the inverse tapered section 204". The mode stripper 202" is analogous to the mode stripper 140/140'. Thus, the length, l, width and thickness may be as described previously. The sides of the inverse tapered section 204" taper out linearly. However, the slope of the line is different from the inverse tapered section 204' depicted in FIG. 6. In addition, the mode stripper 202" tapers down. Thus, the mode stripper 202" may be viewed as including a gap 203. The gap 203 may aid in coupling light in the mode stripper 202" to the inverse tapered section 204".

Figure 8:
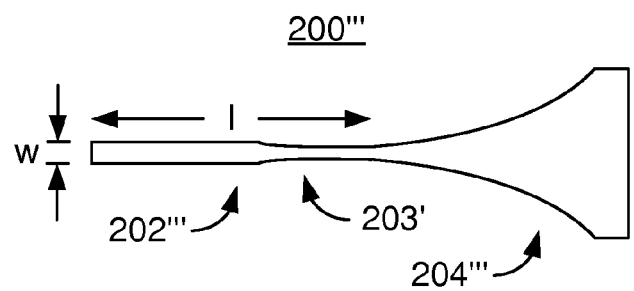

FIG. 8 depicts an embodiment of a portion of the waveguide 200''' including the mode stripper 202''' and the inverse tapered section 204'''. The mode stripper 202''' is analogous to the mode stripper 140/140'. Thus, the length, l, width and thickness may be as described previously. The sides of the inverse tapered section 204" tapers out in accordance with a curve. In addition, the mode stripper 202'''' has a varying geometry. The mode stripper 202''' tapers down in accordance with a curve then may taper back out slightly. Other mode strippers (not shown) might include other variations in the geometry.

Thus, the waveguides 200, 200', 200" and 200''' may have geometries that differ somewhat from the geometries of the waveguides 130, 130' and/or 130". However, the mode strippers 202/202'/202"/202''' may still effectively suppress undesirable modes of energy. The inverse tapered sections 204/204'/204"/204''' may also couple the mode from the mode strippers 202/202'/202"/202''' to the remainder of the waveguide. Thus, the benefits of the waveguides 130, 130' and/or 130" and the HAMR disk drive 100 may be achieved.

Figure 9:
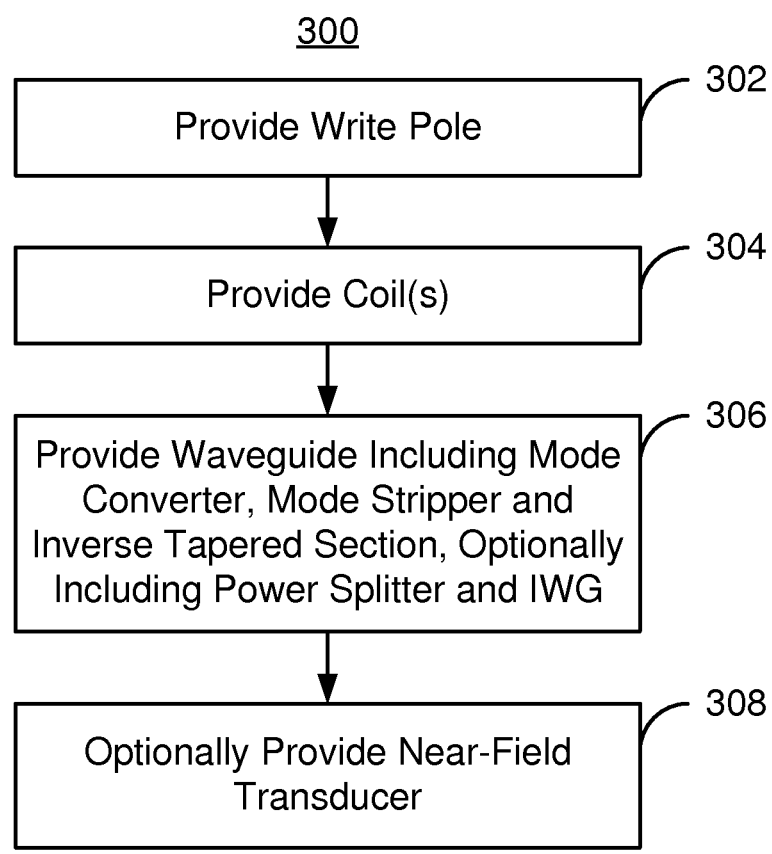
FIG. 9 is a flow chart depicting an exemplary embodiment of a method for fabricating a HAMR write apparatus.

FIG. 9 is a flow chart depicting an exemplary embodiment of a method 300 for fabricating HAMR disk drives having improved optical efficiency. In particular, the method 300 may be used in fabricating a HAMR disk drive 100. For simplicity, some steps may be omitted, performed in another order, interleaved with other steps and/or combined. The method 300 is described in the context of forming a single disk drive 100. However, the method 300 may be used to fabricate multiple disk drives at substantially the same time. The method 300 and system are also described in the context of particular components. However, such components may include multiple sub-components that are also manufactured.

The write pole 124 is fabricated, via step 304. Step 304 may include forming top and/or bottom bevels in the pole tip and otherwise shaping the main pole. The coil(s) 126 may be provided, via step 304. The waveguide 130, 130', 130", 200, 200', 200" and/or 200''' are fabricated, via step 306. Step 306 may include depositing the core layer on a cladding layer, providing a photoresist mask in the desired shape of the core for the waveguides 130/130'/130"/200/200'/200"/200''', removing the exposed portions of the core and depositing a cladding layer. Thus, the mode converter, mode stripper, inverse tapered section, power splitter and IWG may be provided. The NFT may also be provided, via step 308. Fabrication of the transducer may then be completed.

Thus, using the method 300, the HAMR disk drive 100 and waveguides 130, 130',130", 200, 200', 200', 200''' and/or some combination thereof may be provided. Consequently, the benefits of the waveguides 130, 130', 130", 200, 200', 200', 200''' and mode strippers 150, 150', 150", 202, 202', 202". 202'''' may be achieved.

We claim:

1. A heat assisted magnetic recording (HAMR) write apparatus including a laser for providing energy and having an air-bearing surface (ABS) configured to reside in proximity to a media during use, the HAMR write apparatus comprising:

a write pole configured to write to a region of the media;
at least one coil for energizing the write pole; and
a waveguide optically coupled with the laser, the waveguide including an entrance distal from the ABS and a bottom proximate to the ABS, the waveguide also including a mode converter, a mode stripper optically coupled with the mode converter and an inverse tapered section optically coupled with the mode stripper, the mode converter having sides converging from a first width proximate to the entrance to a second width distal from the entrance, the first width being greater than the second width, the mode stripper being between the inverse tapered section and the mode converter, the inverse tapered section having an inverse tapered section entrance and an inverse tapered section exit, the inverse tapered section entrance being narrower than the inverse tapered section exit.

2. The HAMR write apparatus of claim 1 wherein the waveguide further includes:
a power splitter optically coupled with the inverse tapered section exit; and
an interferometric waveguide optically coupled with the power splitter, the interferometric waveguide including a plurality of arms for carrying light.

3. The HAMR write apparatus of claim 2 wherein the mode stripper has a mode stripper width of not more than eighty percent of a width of each of the plurality of arms.

4. The HAMR write apparatus of claim 1 wherein the waveguide is configured to deliver at least a fundamental mode of the energy from the laser, the mode stripper being configured such that modes other than the fundamental mode undergo a loss of at least ninety percent along the mode stripper.

5. The HAMR write apparatus of claim 4 wherein the fundamental mode undergoes a fundamental mode loss of not more than ten percent along the mode stripper.

6. The HAMR write apparatus of claim 1 wherein the mode stripper has a mode stripper width of not more than eighty percent of a width of any remaining portion of the waveguide.

7. The HAMR write apparatus of claim 1 further comprising:
a near-field transducer (NFT) optically coupled with the waveguide, the NFT for coupling the energy from the waveguide into the media.

8. A heat assisted magnetic recording (HAMR) data storage device comprising:
a media for storing data;
a laser for providing energy; and
a slider having an air-bearing surface (ABS) configured to reside proximate to the media during use, the slider including a HAMR transducer having a write pole, at least one coil for energizing the write pole and a waveguide optically coupled with the laser, the write pole being configured to write to a region of the media, the waveguide being optically coupled with the laser, the waveguide including an entrance distal from the ABS and a bottom proximate to the ABS, the waveguide also including a mode converter, a mode stripper optically coupled with the mode converter and an inverse tapered section optically coupled with the mode stripper, the mode converter having sides converging from a first width proximate to the entrance to a second width distal from the entrance, the first width being greater than the second width, the mode stripper being between the inverse tapered section and the mode converter, the tapered section having an inverse tapered section entrance and an inverse tapered section exit, the inverse tapered section entrance being narrower than the inverse tapered section exit.

9. The HAMR data storage device of claim 8 wherein the waveguide further includes:
a power splitter optically coupled with the inverse tapered section exit; and
an interferometric waveguide optically coupled with the power splitter, the interferometric waveguide including a plurality of arms for carrying light toward the ABS.

10. The HAMR data storage device of claim 8 wherein the waveguide is configured to deliver at least a fundamental mode of the energy from the laser, the mode stripper being configured such that modes other than the fundamental mode undergo a loss of at least ninety percent along the mode stripper and the fundamental mode undergoes a fundamental mode loss of not more than ten percent along the mode stripper.

11. The HAMR data storage device of claim 8 wherein the HAMR transducer further includes:
a near-field transducer (NFT) optically coupled with the waveguide, the NFT for coupling the energy from the waveguide into the media.

12. A method for providing a heat assisted magnetic recording (HAMR) write apparatus including a laser for providing energy and having an air-bearing surface (ABS) configured to reside in proximity to a media during use, the method comprising:
providing a write pole configured to write to a region of the media;
providing at least one coil for energizing the write pole; and
providing a waveguide optically coupled with the laser, the waveguide including an entrance distal from the ABS and a bottom proximate to the ABS, the waveguide also including a mode converter, a mode stripper optically coupled with the mode converter and an inverse tapered section optically coupled with the mode stripper, the mode converter having sides converging from a first width proximate to the entrance to a second width distal from the entrance, the first width being greater than the second width, the mode stripper being between the inverse tapered section and the mode converter, the tapered section having an inverse tapered section entrance and an inverse tapered section exit, the inverse tapered section entrance being narrower than the inverse tapered section exit.

13. The method of claim 12 wherein the step of providing the waveguide further includes:
providing a power splitter optically coupled with the inverse tapered section exit; and
providing an interferometric waveguide optically coupled with the power splitter, the interferometric waveguide including a plurality of arms for carrying light toward the ABS.

14. The method of claim 13 wherein the mode stripper has a mode stripper width of not more than eighty percent of a width of each of the plurality of arms.

15. The method of claim 12 wherein the step of providing the waveguide further includes:
configuring the waveguide to deliver at least a fundamental mode of the energy from the laser, the mode stripper being configured such that modes other than the fundamental mode undergo a loss of at least ninety percent along the mode stripper and such that the fundamental mode undergoes a fundamental mode loss of not more than ten percent along the mode stripper.

16. The method of claim 12 wherein the mode stripper has a mode stripper width of not more than eighty percent of a width of any remaining portion of the waveguide.

17. The method of claim 12 further comprising:
    providing a near-field transducer (NFT) optically coupled with the waveguide, the NFT for coupling the energy from the waveguide into the media.

\* \* \* \* \*